(12) United States Patent
Shaul

(10) Patent No.: US 8,948,741 B2
(45) Date of Patent: Feb. 3, 2015

(54) SYSTEM AND METHOD OF ONLINE RADIATION MANAGEMENT AND CONTROL OF NON-IONIZING RADIATION SOURCES

(75) Inventor: David Shaul, Kfar Saba (IL)

(73) Assignee: Wave Guard Technologies Ltd., Kfar Saba, IL (US)

( * ) Notice: Subject to any disclaimer, the term of this patent is extended or adjusted under 35 U.S.C. 154(b) by 0 days.

(21) Appl. No.: 13/498,016

(22) PCT Filed: Sep. 21, 2010

(86) PCT No.: PCT/IL2010/000789
§ 371 (c)(1),
(2), (4) Date: Mar. 23, 2012

(87) PCT Pub. No.: WO2011/036664
PCT Pub. Date: Mar. 31, 2011

(65) Prior Publication Data
US 2012/0208529 A1 Aug. 16, 2012

Related U.S. Application Data

(60) Provisional application No. 61/245,357, filed on Sep. 24, 2009.

(51) Int. Cl.
*H04W 24/00* (2009.01)
*H04B 17/00* (2006.01)

(52) U.S. Cl.
CPC ................................ *H04B 17/0032* (2013.01)
USPC ................... 455/423; 340/539.1; 340/539.26; 340/539.28

(58) Field of Classification Search
USPC ....................................... 340/539.1; 455/423
See application file for complete search history.

(56) References Cited

U.S. PATENT DOCUMENTS 7,593,753 B1 * 9/2009 Rausch ...................... 455/562.1
2001/0000191 A1 4/2001 Barkan et al.
(Continued)

FOREIGN PATENT DOCUMENTS

| WO | 01000191 | 4/2001 |
| WO | 06064721 | 4/2003 |
| WO | 04121807 | 6/2004 |
| WO | 2004/086066 | 10/2004 |
| WO | 07205891 | 9/2007 |

OTHER PUBLICATIONS

"Real-time performance monitoring and optimization of cellular systems", Per Gust.s, Per Magnusson, Jan Oom and Niclas Storm, First published in Ericsson Review No. 01, 2002.
(Continued)

*Primary Examiner* — Tung X Le
*Assistant Examiner* — Jonathan Cooper
(74) *Attorney, Agent, or Firm* — Dicke, Billig & Czaja, PLLC

(57) ABSTRACT

A computerized system for continuously monitoring the radiation coming from one or more radiation sources in a site, comprising: (a) a processing unit, for comparing radiation related data with regulation operational permits of the radiation sources, wherein the processing unit receives data files from the radiation sources and extracts from them the radiation related data; (b) a permits server for providing the regulation operational permits to the processing unit, wherein the permits server is connected to the processing unit; (c) an anomaly generator for receiving the compared radiated data from the processing unit, and generating an anomaly data file; wherein the anomaly file is utilized for managing and controlling the radiation sources, and detecting radiation anomaly in the site.

19 Claims, 6 Drawing Sheets

(56) References Cited

U.S. PATENT DOCUMENTS

| | | | |
|---|---|---|---|
| 2003/0064721 | A1 | 4/2003 | Veysset et al. |
| 2004/0121807 | A1 | 6/2004 | Delbreil et al. |
| 2004/0212499 | A1* | 10/2004 | Bohinc, Jr. ............... 340/539.29 |
| 2007/0205891 | A1* | 9/2007 | Spencer et al. ........... 340/539.29 |
| 2009/0289760 | A1* | 11/2009 | Murakami et al. ........... 340/5.82 |
| 2010/0141426 | A1* | 6/2010 | Zajac et al. ................ 340/539.1 |

OTHER PUBLICATIONS

Gustas. Magnusson, Oom and Storm, "Real-time Performance Monitoring and Optimization of Cellular Systems", First published in Ericsson Review, Issue No. 1/ 2002.

International Preliminary Report on Patentability Chapter II (IPEA/409) for PCT/IL2010/000789, published May 17, 2012.

* cited by examiner

SYSTEM AND METHOD OF ONLINE RADIATION MANAGEMENT AND CONTROL OF NON-IONIZING RADIATION SOURCES

FIELD OF THE INVENTION

The present invention relates to environmental control of radiation sources. More particularly, the invention relates to continuous management and control of wireless radio telecommunication non-ionizing radiation sources.

BACKGROUND OF THE INVENTION

In recent years, concerns have been raised about a possible link between some types of non-ionizing radiation and cancer. Non-ionizing radiation is low-frequency radiation that does not have enough energy to directly damage DNA, but it may be able to affect live human cells in other ways. Cell phones, as other electrical devices emit non-ionizing radiation. Therefore, cellular network operators are subjected to governmental laws and regulations regarding the level of radiation emitted from their transmitting sources.

In a typical cellular radio system, Base Stations (BSs) and mobile User Equipment units (UEs) communicate voice and data via a Radio Access Network (RAN) to one or more core networks. BSs are typically cellular base stations, which consist of transceivers and antennas. The mobile UEs are mobile devices, such as cellular telephones and laptops with mobile termination. The core network is a central part of a telecom network that provides various services to customers who are connected to it.

The RAN covers a geographical area which is divided into cell areas, each of which is served by a base station. A cell area is a geographical area wherein radio coverage is provided by the radio equipment in the base stations. Each cell is identified by a unique identity, which is broadcasted by the cell. The base station communicates over the air interface (e.g., using radio frequencies) with the mobile UEs within the cell area. In typical RANs several base stations are typically connected (e.g., by landlines or microwave channels) to a Radio Network Controller (RNC). The RNC (also known as a Base Station Controller) supervises and coordinates various activities of the plural base stations connected to it. The RNCs are typically connected to one or more core networks.

The Universal Mobile Telecommunications System (UMTS) is a third generation mobile communication system, which evolved from the Global System for Mobile Communications (GSM), and is intended to provide improved mobile communication services, based on Wideband Code Division Multiple Access (WCDMA) technology. Code division multiple access-based systems use a wider frequency band to achieve the same rate of transmission as FDMA, In a forum known as the Third Generation Partnership Project (3GPP), telecommunications suppliers proposed and agreed upon standards for third generation networks and Universal Terrestrial Radio Access Network (UTRAN) specifically. The UTRAN contains cellular base stations (also known as Node Bs), and Radio Network Controllers (RNCs). The RNC provides control functionalities for one or more Node Bs. Node B contains radio frequency transmitters and receivers used to communicate directly with the mobile UEs, which move freely around it. In this type of cellular network, the mobile UEs cannot communicate directly with each other but have to communicate with the Node B.

Base Stations, which are typically the most radiating source in the cellular system, are subjected to governmental laws and regulations. Thus, Base Stations require an operational permit. The terms of the permit and its requirements are usually based on ICNIRP (International Council on Non-Ionizing Radiation Protection) recommendations regarding the level of radiation and power per transmitter source. The 3GPP forum investigated enhanced ways to control the power of third generation networks with advance measurement. One result of the forum's work is the UTRAN Iur interface Radio Network Subsystem Application Part (RNSAP) signaling, as described in 3GPP TS 25.423 V3.14.2 (2004-07), for example. This standard specifies the radio network layer signaling procedures of the control plane between RNCs in UTRAN, in which the transmitted power is one of those measurements.

Today, enforcing the regulations regarding the level of radiation emitted from the transmitting sources of cellular operators requires periodic measurements of the RF power density at each cellular site. However, such measurements present many technical challenges and difficulties. Protocols for the measurement of RF energy for the purpose of human exposure assessment often recommend the use of an "isotropic broadband probe" because this type of sensor responds, equally to energy arriving from any direction, and over a broad frequency range, as does the human body. These instruments are commonly used because they allow a simple measurement. However, some of the meters used for typical RF compliance surveys are unable to accurately measure the low power densities present at some cellular sites.

A related problem involves the concurrent presence of several signals from different antennas, such that the radiation reading produced by the measuring instrument is a combination of all the signals in the measuring spot. Realistically, this composite measurement of all signals may be the most relevant exposure metric. However, once radiation anomaly is detected, it is required to discover the cause (e.g., antenna power, antenna direction, feeder loss, etc.) for the anomaly. Measuring the radiation in a specific spot fails to indicate the over-power radiating source.

In addition, the measurement must be performed in a time in which radiation anomaly indeed occurs. It is well known that the radiation levels at a cellular site are not always constant. People use their cellular phones more at some times of the day, and on some days of the week, than at others. The cellular service providers maintain additional capacity which becomes active as needed to meet the demands. Each active channel adds to the measured radiation at the cellular site. Thus, the probability to detect the radiation anomaly when performing periodic measurements is relatively low.

Common radiation monitoring methods include radiation intermediate surveys and radiation probes in field stations. Radiation measurement field station is a device capable of measuring the radiation in a site. The radiation measurement field station is typically located in a specific spot in the measured site. However, radiation measurement field stations suffer many drawbacks. They hardly allow repeating similar tests, they don't allow automating the same data collection on large volumes, they require manual collection of data, they make it hard to reference data coming from different sources, and they are very expensive.

In recent years, cellular networks have become more and more complex. As a result, there is a need for a simple and automated operation and maintenance (O&M) method. In order to decrease management costs, to use hardware in the most effective way, and to maximize spectrum efficiency, which is typically a limited resource, cellular networks are adapted to produce real-time event messages. An event message is a measurement report sent between different components in the cellular network (e.g., RNC, Node B, UE, etc).

Event messages can be categorized to several types depends on the types of measurements encapsulated within, and on the network components participating in the messaging.

The measurement reports are transferred through many types of messages including RRC (Radio Resource Control) protocol messages, NBAP (Node B Application Protocol) messages, and frame protocol messages. The different reports include a wide variety of parameters measurements, for example, traffic volume, channel quality, propagation delay, carrier power, path loss, and many more. The number of different parameters measured and reported reaches several hundreds in a typical cellular system. Ericsson ("Real-time performance monitoring and optimization of cellular systems", Per Gust.s, Per Magnusson, Jan Oom and Niclas Storm, First published in Ericsson Review no. 01, 2002) discloses a real-time optimization of a radio access network utilizing the system event messages. However, Ericsson as other providers utilizes real-time event messages for monitoring performance and system optimization, and not for radiation control.

None of the currently available techniques provide a satisfying solution to the problem of managing and controlling radiation sources. Therefore, there is a need for a system that provides a continuous monitoring of radiation sources, which incorporates the important benefits of prior art techniques, and allows accurate measurement and calculation of radiation coming from different sources for detecting radiation anomaly in real time.

It is therefore an object of the present invention to provide a system for automatically and continuously managing and controlling wireless radio telecommunication non-ionizing radiation sources.

Another object of the present invention is to provide a system for guaranteeing that cellular network operators are subjected to governmental laws and regulations.

Another object of the present invention is to accurately calculate the percentage of radiation level anomalies at cellular sites.

Another object of the present invention is to provide a system for detecting radiation anomaly in real time, and decreasing the average time for treating the radiation anomaly.

Another object of the present invention is to immediately discover the source of the radiation anomaly.

Yet another object of the present invention is to provide a cost-effective system for detecting radiation anomaly.

Other objects and advantages of the invention will become apparent as the description proceeds.

SUMMARY OF THE INVENTION

In a first aspect, the present invention is directed to a computerized system for continuously monitoring the radiation coming from one or more radiation sources in a site, which comprising: (a) processing unit, for comparing radiation related data with regulation operational permits of the radiation sources, wherein the processing unit receives data files from the radiation sources and extracts from them the radiation related data; (b) permits server for providing the regulation operational permits to the processing unit, wherein the permits server is connected to the processing unit; and (c) anomaly generator for receiving the compared radiated data from the processing unit, and generating an anomaly data file, wherein the anomaly file is utilized for managing and controlling the radiation sources, and detecting radiation anomaly in the site.

In an embodiment of the system of present invention, the radiation sources are wireless radio telecommunication non-ionizing radiation sources.

In an embodiment of the system of the present invention, the processing unit processes and analyzes the radiation parameters of each radiation source according to the extracted radiation related data.

In an embodiment of the system of the present invention, the processing unit processes and analyzes the radiation parameters essentially on-line, within minutes.

In an embodiment of the system of the present invention, the data files are binary data files comprising real-time: event messages transferred between different components in the monitored site.

In an embodiment of the system of the present invention, the processing unit comprises: (a) delacer for extracting the radiation related data from the binary data files; and (b) verificator for comparing the radiation related data with the radiation permits of each the radiation sources.

In an embodiment of the system of the present invention, the delacer extracts the power data of each antenna and sector in the monitored site.

In an embodiment of the system of the present invention, the delacer encompasses one or more decoders, adapted to analyze in parallel the data files received from the radiation sources.

In one embodiment of the system of the present invention, the verificator further compares the radiation related data from the User Equipment units (UEs) with the radiation related data from the radiated sources operators, for detecting forgery in the operator reports.

In one embodiment the system of the present invention further comprises a filter for filtering out private data related to the operator clients from the binary data files.

In an embodiment the system of the present invention further comprises a history database containing history data record definitions of any track record radiation based data anomaly and event handling definitions of the event track recording.

In another aspect the present invention is directed to a method of continuously managing and controlling radiation sources in a site, comprising: (a) receiving data files from the radiation sources; (b) signing the file immediately after its creation; (c) extracting the radiation related data from the files by filtering relevant parameters values from all the communication protocol layers; (d) comparing the radiation related data with the regulation radiation permits of the radiation sources; and (d) generating an anomaly data file.

In one embodiment the method of the present invention further comprises collecting the data files close to the radiation power transmissions time, without operator intervention for protecting against forgery.

In one embodiment the method of the present invention further comprises sending online the anomaly data Me within minutes since the anomaly or illegal occurrences to the radiation sources regulator, wherein the file is utilized by the regulator for managing and controlling the radiation sources.

In one embodiment the method of the present invention further comprises utilizing the data in the history database for identifying abnormal and illegal radiation patterns and behaviors for health researches.

In one embodiment the method of the present invention further comprises comprising verifying operator reports by comparing radiation related data from the User Equipment units (UEs) with radiation related data from the radiated sources operators.

BRIEF DESCRIPTION OF THE DRAWINGS

The above and other characteristics and advantages of the invention will be better understood through the following illustrative and non-limitative detailed description of embodiments thereof, with reference to the appended drawings, wherein.

DETAILED DESCRIPTION OF THE INVENTION

In the following description, for the purpose of illustration, numerous specific details are provided. As will be apparent to the skilled person, however, the invention is not limited to such specific details and the skilled person will be able to devise alternative arrangements.

The key idea of the present invention is to manage and control non-ionizing radiation sources, online The system proposed by the present invention is capable of alerting supervisory bodies, cellular radiation source owners, and local municipalities and districts of non-ionizing environmental hazards, essentially in real-time. Each transmitter in a cellular network is executing live measurement of the RF link. The system proposed by the present invention uses those accurate transmitters' measurements and performs analysis and calculations, in order to compare them with the parameters set of the permit.

Figure 1:
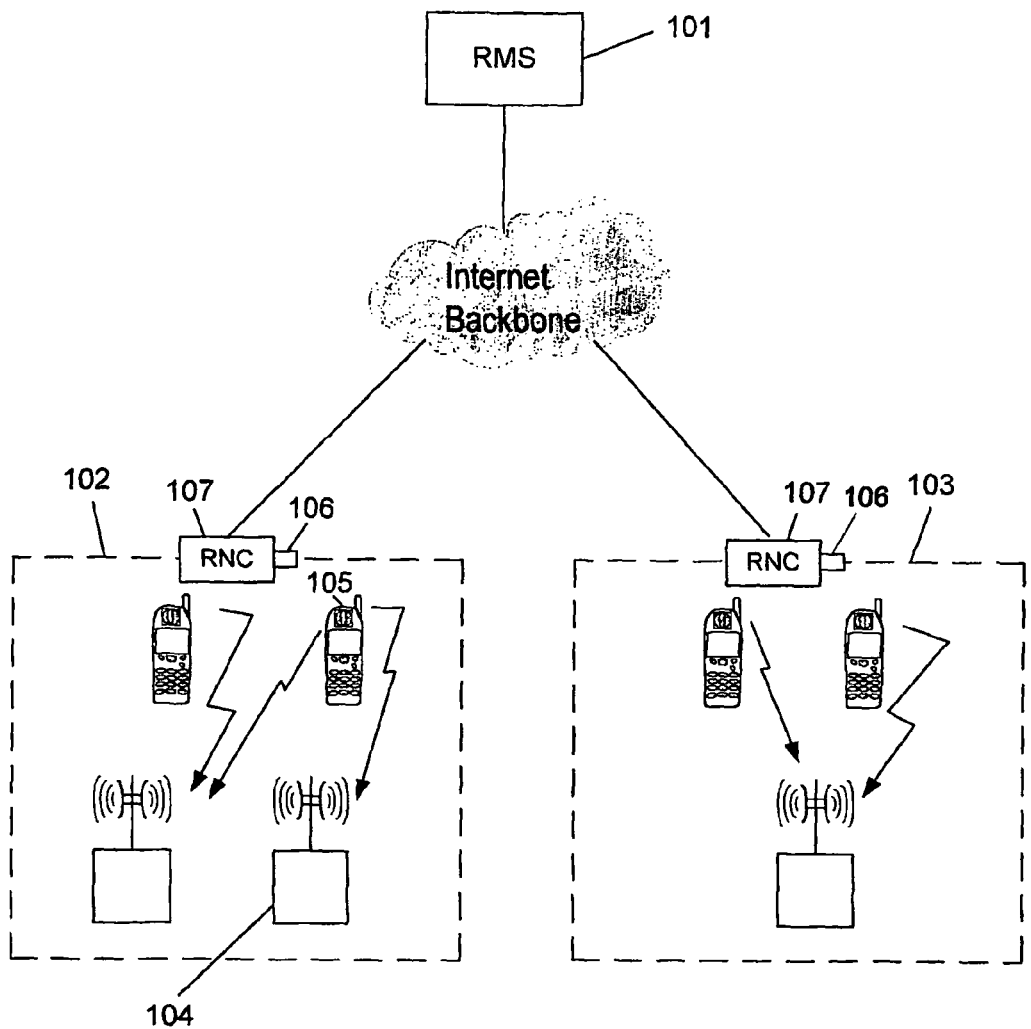
FIG. 1 is a high level schematic illustration of an on-line radiation management and control system, constructed and operated in accordance with one embodiment of the present invention.

FIG. 1 is a high level schematic illustration of an on-line radiation management and control system, constructed and operative in accordance with an embodiment of the present invention. The Radiation Management System (RMS) 101 is the data management system which interfaces, via the Internet, for example, with one or more radio access networks 102-103. The RMS interfaces and operates with one or more cellular network operators. Each access network 102-103 consists of one or more Radio Network Controller (RNC) 107, antennas which carry the power of the BS (Base Station) 104 and the UE (User Equipment unit) 105. The system proposed by the present invention 106, is connected to the Radio Network Controller (RNC) 107. The present invention comprises a software module, which continuously monitors the information transfers between the RNC 107 and the BS 104.

The information transfers between the RNC 107 and the BS 104 comprises network measurements including performance measurement, downlink (DL) power measurements, uplink (UL) power measurements, and changes to the power level of each radiation source. Each BS and UE is capable of measuring and calculating a set of predefined performance factors, according to current 3GPP 25.423 specification, such as, a current transmit power level as well as other measurements. The antenna position and other given measurements may also be obtained.

The performance measurement messages together with the DL power measurement are used to formulate on-line measurement values to a radiated power element readings. In addition, the local radiation situation per radiation sources (antenna or sector, for example) may be ascertained. The system proposed by the present invention analyzes the radiation level of each source. The values obtained are compared to reference point levels, and a delta ($\Delta$) value, namely the difference between the real radiation level and the reference value is calculated for each radiation sources. The radiation is calculated online and compared with the values approved by the local environmental regulator (as recorded in the site permit). Those calculations may be used as a new reference point for alarm management and together with a time stamp record, may be used as a database for non-ionizing environmental and health research.

The system proposed by the present invention is adapted to perform online auto-correlation of a plurality of power measurements. The system is thus able to present a clear overview and control on any power and radiation anomaly in the region. Any detected anomaly can be sent by the system as an alert and may be subjected to further investigation. All detected alarms may be recorded for pattern recognition proposes.

In one embodiment, the system proposed by the present invention is adapted to retrieve the on-line level of radiation data from each antenna's coverage area. By knowing the specific location of the radiation source (e.g., the latitude and longitude, which can be found in the permit approval given by the regulator), the system is able to determine which radiation source is responsible for the radiation anomaly. The system manages a radiation source location table, which is updated each time a new site location is introduced or each time a radiation source is relocated. The site specific location may be retrieved from other database sources or from the updated location table.

Any radiation anomaly which is detected may be geographically displayed based for example on the site location information tables and radiation delta ($\Delta$) values. In addition, the method proposed by the present invention is adapted to utilize the geographic data or cell/site id to determine the anomaly record of the radiation source footprints. The system may also collect mobile radiation data and power anomalies and store the information in a database, for further environmental and health investigation.

Figure 2:
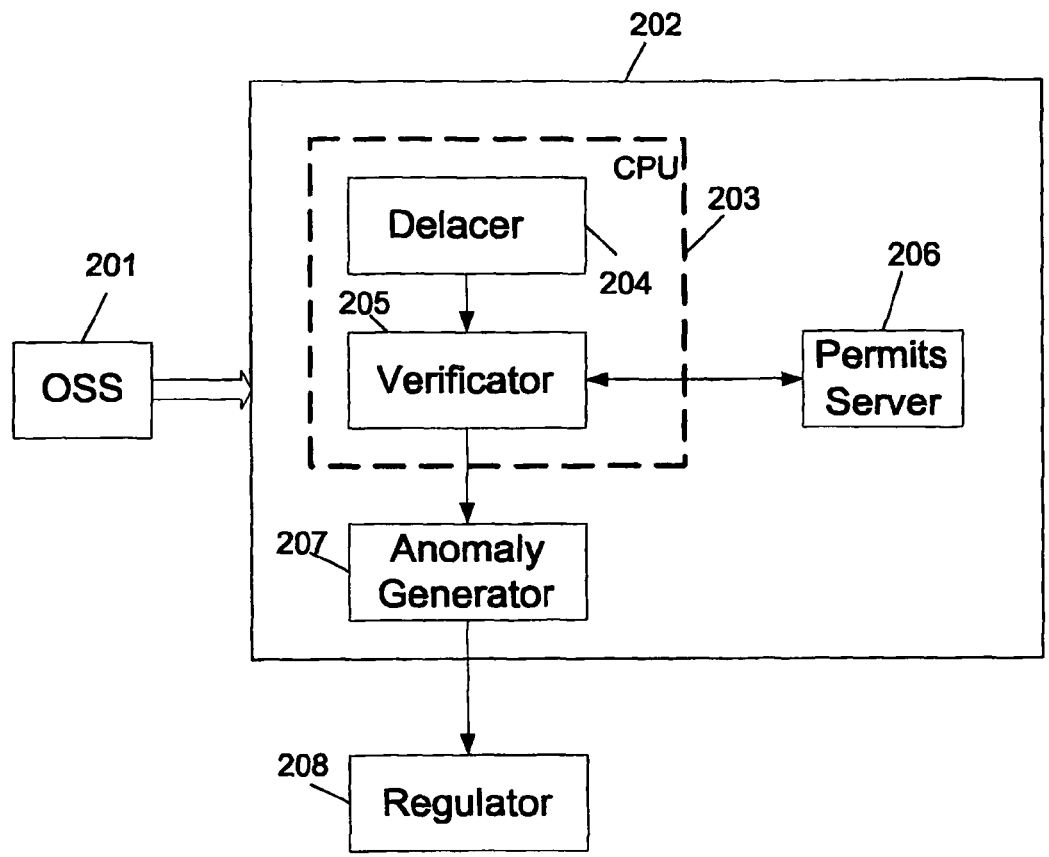
FIG. 2 is a schematic block diagram of one exemplary embodiment of the anomaly detecting part of the present invention.

FIG. 2 is a schematic block diagram of one exemplary embodiment of the anomaly detecting part of the present invention. The computerized system 202 continuously monitors the radiation data coming from one or more radiation sources in a site for detecting radiation anomaly. In this embodiment, the system 202 receives data files from Operation Support System (OSS) 201 of the monitored radiation sources. OSS 201 is the cellular operator subsystem which is responsible of the cellular continues operation. The OSS collects and gathers performance data on each antenna/sector in the cellular system According to this embodiment, processing unit 203 receives binary data files from OSS 201 and extracts from them the radiation related data. The processing unit 203 then compares the extracted radiation related data with the regulation operational permits of said radiation sources. The regulation operational permits are provided by permits server 206 connected to said processing unit 203. Anomaly generator 207, connected to processing unit 203, receives the compared radiated data and generates an anomaly data file. In this embodiment, the anomaly data file contains all the radiation anomalies per each antenna/sector. The anomaly data file is sent to site regulator 208 and utilized by him for managing and controlling the radiation sources in the monitored site.

In this embodiment, the radiation sources are wireless radio telecommunication non-ionizing radiation sources. The level of the radiation emitted from the radiation sources constantly changes, and therefore, in order to overcome cases in which radiation anomaly occurs and not measured, the processing unit 203 constantly extracts the radiation related data of each radiation source from the binary data files. The processing unit 203 then calculates accordingly the radiation level for each radiation source. The radiation data levels are analyzed essentially in real time, namely within minutes, thus the radiation anomaly is immediately detected.

According to one embodiment, the processing unit comprises a delacer 204 and a verificator 205. Delacer 204 is a processing module that extracts the radiation related data from the binary data files (e.g., power data of each antenna/sector in the monitored site): The data is extracted from all the communication protocol layers (e.g., transport, physical, etc.) by filtering the relevant parameters values from all the communication protocol layers. The essentially real time operation is allowed due to a smart algorithm which executes the binary data filtering and analyzes on one or more decoders in the delacer 204, in parallel. The binary data file comprises real time event messages which are transferred between the different components in the monitored site. A filter is utilizes to filter out private data related to the operator clients from the binary data files. Verificator 205 is a processing module that receives the filtered private data and compares the extracted radiation related data with the operational permits of the radiation sources.

Even though the system 202 collects the data files close to the radiation power transmissions, namely straight from the RNC and OSS, without operator data transaction, and mark the data to prevent forgery, the verificator 205 compares the radiation related data from the User Equipment units (UEs) side with the radiation related data from the radiated sources operator, in order to detect forgery in the operator reports. The system 202 is adapted to send the generated anomaly data file online to the radiation sources regulator. The anomaly data file is utilized by the regulator for managing and controlling the radiation sources. The generated anomaly data files are also saved in a database for identifying abnormal and illegal radiation patterns and behaviors for future health researches.

Figure 3:
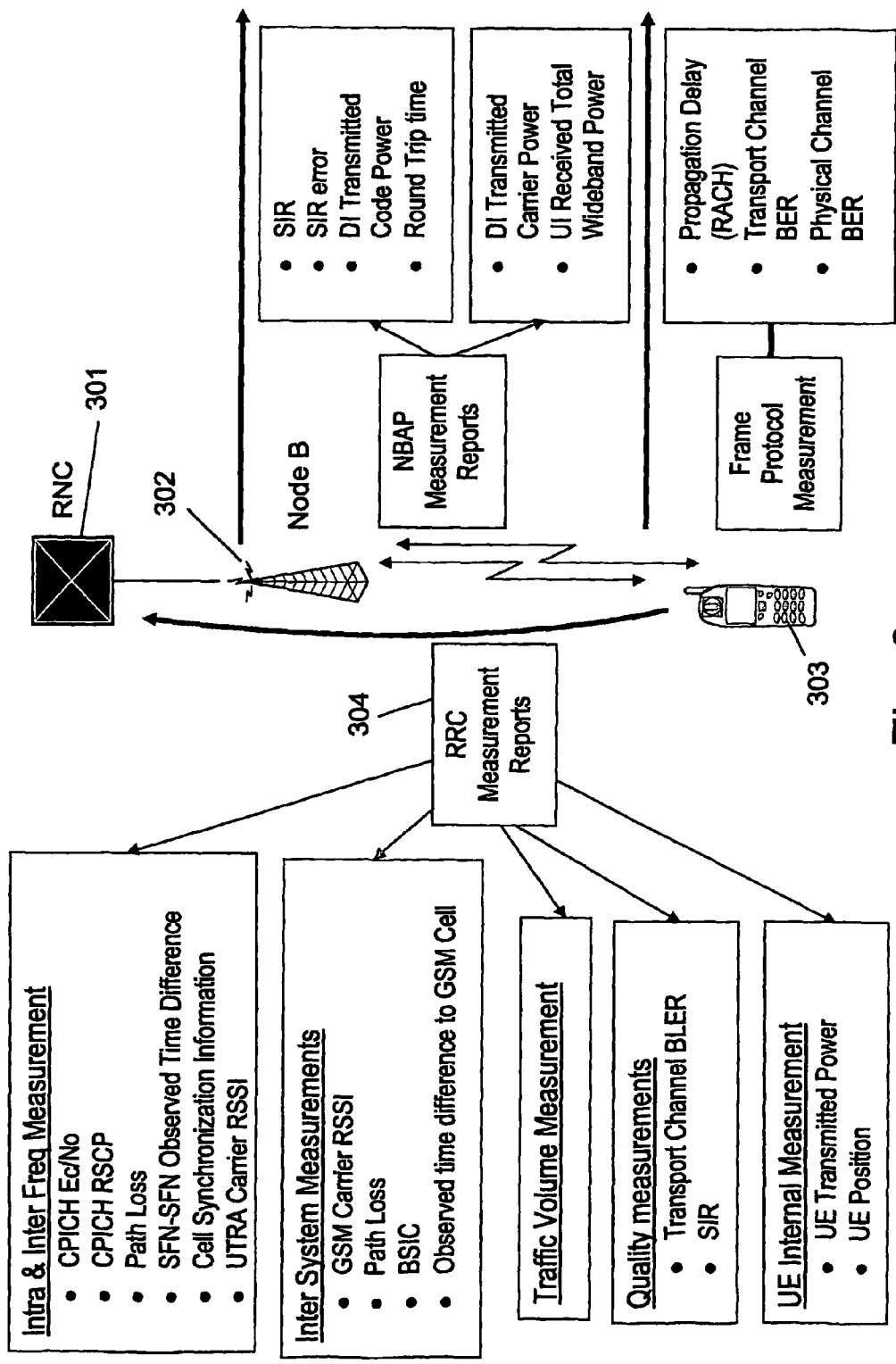
FIG. 3 is a schematic illustration of examples of measurement reports.

FIG. 3 is a schematic illustration of exemplary types of measurement reports from the radio access network controller 301, the base station 302, and the UE 303. The measurement reports can be transferred through RRC [Radio Resource Control] protocol, NBAP [Node B application protocol], and frame protocol. In one embodiment, the RRC reports 304 include intra and inter frequency measurements, inter system measurements, traffic volume measurements, quality and UE internal measurement reports, etc. An example for one of the measurement in 304 is the Signal to Interferences Ratio (SIR). This exemplary measurement is based on the employment of fast closed-loop power control in reverse link to combat channel fading in CDMA based cellular networks. Therefore, the estimation of the SIR is required for closed-loop power control. Transmitting power is adjusted by comparing the SIR estimation with SIR target. Thus, it is crucial to measure the SIR of received signal accurately. Traditional measurement methods strongly depend on pilot channel signal, when the pilots are few, so there is a greater error during the measurement of the SIR.

Figure 4:
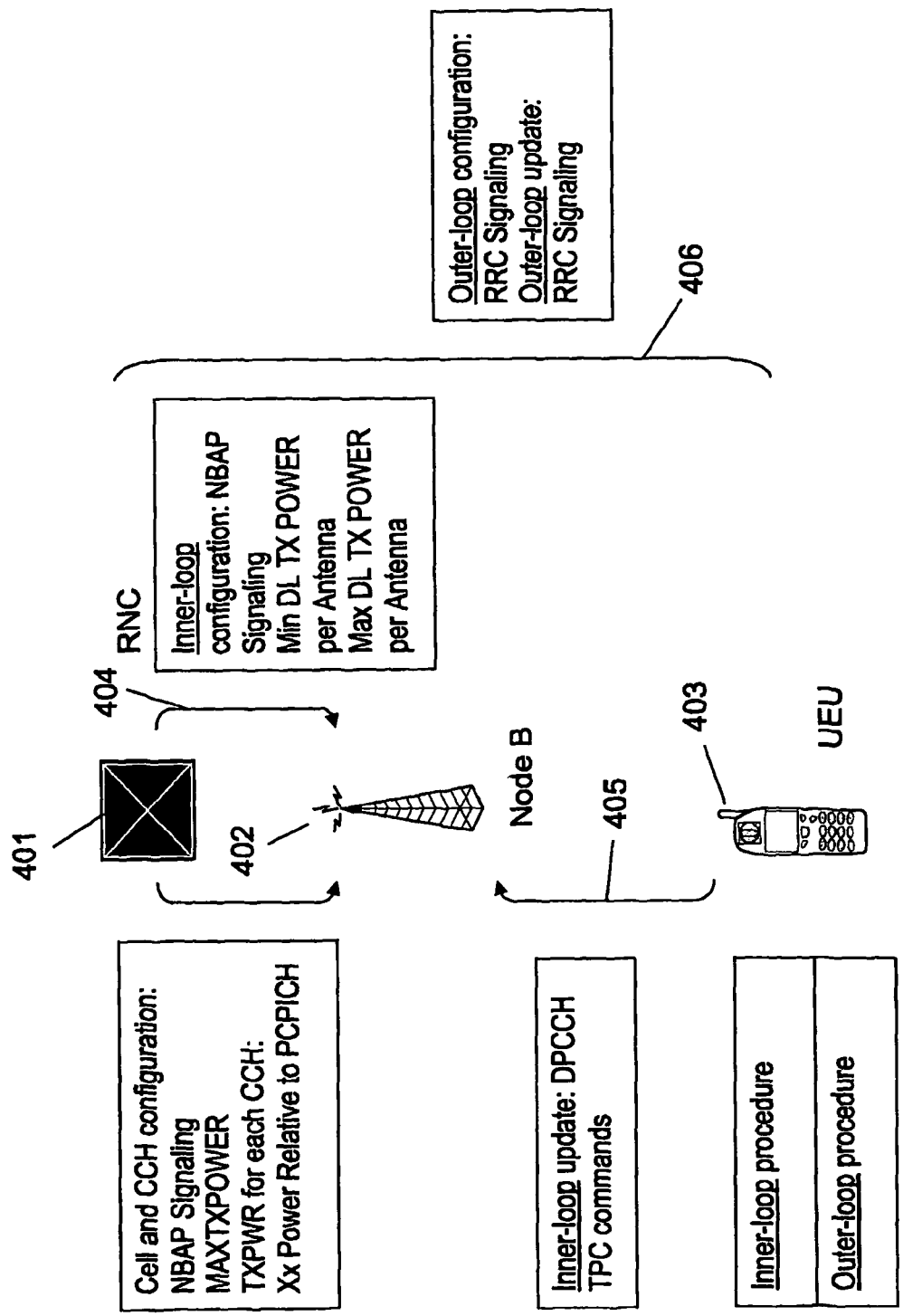
FIG. 4 is a schematic illustration of one embodiment of downlink power control activities.

FIG. 4 is a schematic illustration of one embodiment of downlink power control activities of the RNC 401, which are monitored by the system proposed by the present invention. In this exemplary embodiment, the power control activities which are shared by the RNC 401, Node B 402 and UE 403, both in inner-loops power control process 404 and 405, and in an outer-loop power control process 406, are monitored by the system 202. System 202 monitors the NBAP signals which are transferred from the RNC to Node B in inner loop 404. According to this embodiment, the Minimum and Maximum DL transmissions power per antenna are monitored. In addition, the cell and Common Channel Configuration (CCH) are monitored, e.g., Maximum Transmission Power (MAXTXPOWER), transmit power for CCH, and transmission power relative to Power at Common Pilot Channel (PCPICH). The signals in inner loop 405 which interfaces between UE and Node B are also monitored, namely, the Dedicated Physical Control Channel (DCCH) and the Temporary Power Control (TPC) according to this embodiment. UE 403 executes inner and outer loop processes. UE 403 also sends Total Power Control (TPC) commands to Node B 402 through inner loop 405. The TPC commands are also monitored by system 202.

Figure 5:
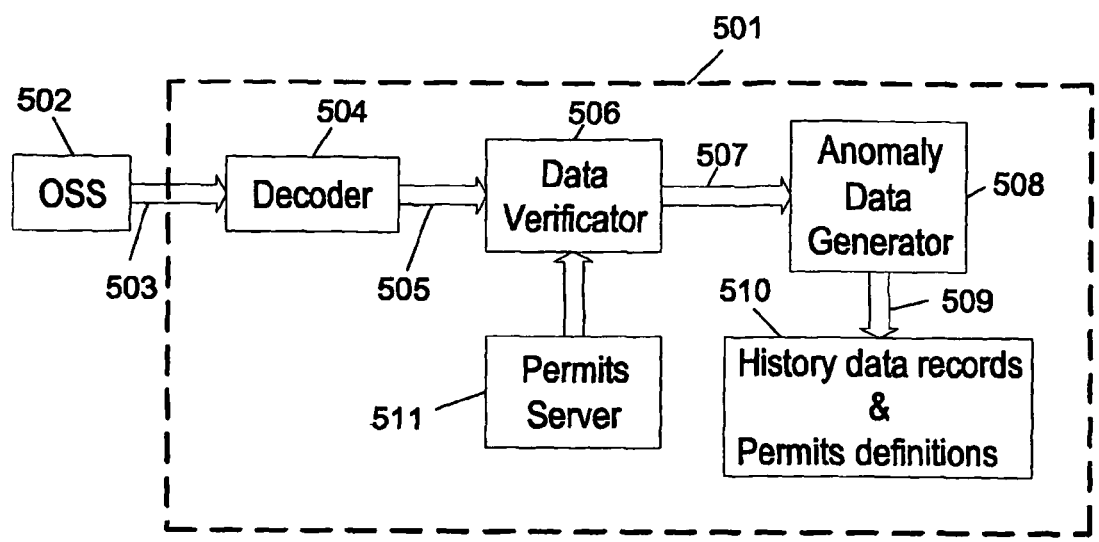
FIG. 5 is a schematic block diagram of another exemplary embodiment of the anomaly detecting part of the present invention.

FIG. 5 is a schematic block diagram of another exemplary embodiment of the anomaly detecting part 501 of the system proposed by the present invention. In this embodiment, the system 202 is connected to Operator Support System (OSS) 502. As part of system 202, a new process is added, in which the NodeB configuration for each antenna/sector is also collected by the OSS 502 from each RNC. The collected data is saved as a binary file and xml file 503, respectively. Those binary and xml files are the input to decoder 504. The decoder 504 is responsible for deriving and analyzing any radiation related information from the cellular network event handling measurements and messages, as saved in the binary file. After analyzing the radiation related information, the radiation data is summarized in tables 505 that contains data summary of radiation related information, such as hourly power data of each antenna/sector in the system and other radiation related data.

The radiation data summary tables 505 are transferred to data verification block 506. The data verification block 506 is adapted to compare radiation data per antenna. The data verification block 506 is responsible of comparing the data in the radiation summary tables 505 with the reference approved radiation data such as power levels, etc. The comparison results 507 are then passed to anomaly data generator 508, which is responsible for scheduled generation of radiation anomaly data. In one embodiment, the anomaly data is generated on an hourly base, namely, one anomaly data file 509 is generated every hour and transferred to history data record and permits definitions block 510. Anomaly data file can be set up to be generated on every 15 min time frame. History data record and permits definitions block 510 contains history data record definitions of any track record radiation based data anomaly and event handling definitions of the event track recording. In the system proposed by the present invention, each radiation anomaly detection, or radiation exposure prevention is defined by the system as event handling. Each historical radiation anomaly event is defined by the system as event recording and can be tracked later on radiation pattern anomalies and public exposure health assessments. Permits server 511 is a reference data archive of radiation related data such as transmitting permits and anomaly record data. The data in permits server 511 is utilized by the data verification block 506.

Figure 6:
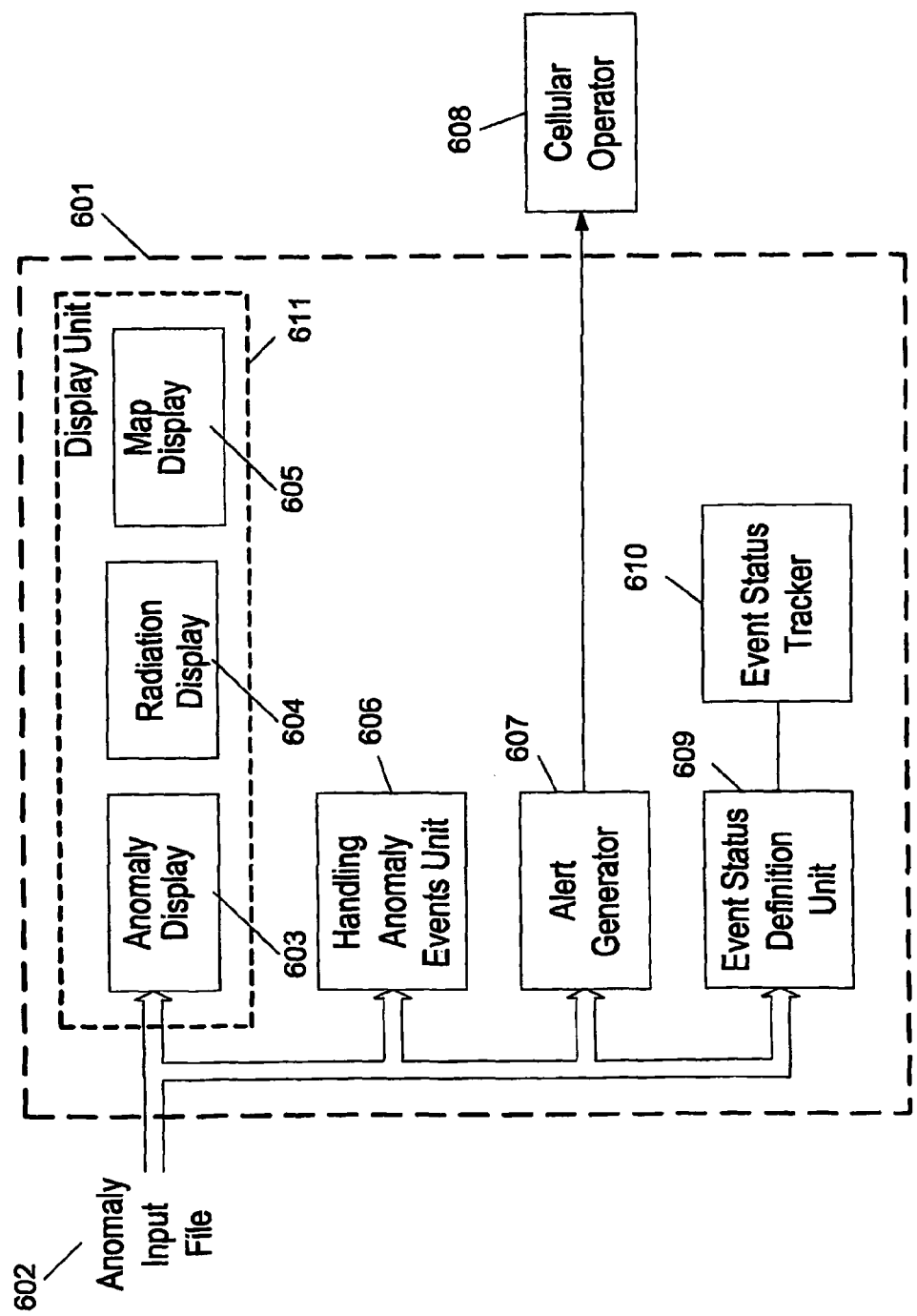
FIG. 6 is a schematic block diagram of the anomaly management part according to one embodiment of present invention.

FIG. 6 is a schematic block diagram of the anomaly management part, according to one embodiment of the present invention. In this embodiment, the anomaly management system 601 receives one anomaly input file 602 each 15 minutes. The anomaly input file 602 is received from the anomaly detecting part 501, illustrated in FIG. 5. The anomaly input file is then executed and data is presented over display unit 611. The anomalies detected are presented over anomaly display 603, gathered radiation related information is displayed over radiation display 604, and a map for reviewing human assessment exposure is display over map display 605. The anomaly file 602 is provided to the handing anomaly event element 606 and to the alert generator 607, which generated and sends an alert message to the cellular operator 608 or to the regulator. The anomaly data file 602 is also provided to event status definition unit 609, which marks the anomaly starting status for further use by event tracker 610. Event tracker 610 is responsible for later tracking of radiation pattern anomalies and for public exposure health assessment.

System 202 of the present invention supports displaying radiation anomaly data in a graphical way. The "National Radiation Supervision and Statistical graphs" function gives the user a national comprehensive overview about the amount of detected non-ionizing radiation anomalies from cellular sources and their distribution per cellular operator through cause and time frames.

This display function is divided into two display options. One display comprises "Supervision graphs" and the other comprises "Statistical graphs". The "Supervision graphs" can display the national summary of the number of radiation anomaly sectors and the radiation anomaly distribution per cellular operator. The "Supervision graphs" include three separate views: number of anomaly sectors, maximum anomaly percentage, and the number of abnormal feeder loss sectors. The "Statistical Graphs" section allows the user to view a history of the total number of radiation anomalies nationwide during different time periods: daily history review, monthly history review and yearly history review.

The system 202 includes a view of the radiation anomaly status for the cellular operators. In one embodiment, each cellular operator in the view appears by its name and logo. Under each operator's logo, a snapshot of the following data is highlighted: number of anomaly sectors, maximum anomaly, and abnormally feeder loss sectors.

The number of anomaly sectors provides the number of sectors in the specific cellular operator network that have been detected with inconsistent radiation data. The inconsistent data is a result of a correlation process between the maximum allowed transmitted power in each sector and the actual transmitted power reported by the cellular network radio controllers. Each inconsistency detected by the system 202 is considered to be one count. The system proposed by the present invention summarizes the total counts of current open detected anomaly event per each operator.

The maximum anomaly provides the percentage of the highest current open detected anomaly event per specific operator. The maximum anomaly represents the severity of the highest open anomaly detected by the system and can be used to set the priority handling anomaly events by the user.

The abnormally feeder loss sectors provides the number of sectors in the specific cellular operator network that have been detected with irregular feeder loss data. Feeder loss represents the RF losses from the MCPA (Multi Carrier Power Amplifier) to the antenna connector. This parameter value is determined at the time a cellular site is commissioned. The abnormal feeder loss monitor alert represents some possibility for human mistake by the cellular operator with relation to the radiation source parameter definitions. Abnormal feeder loss per sector is alerted if the RF losses value which is entered by the non-ionizing radiation source owner is not at common range. If this parameter value is greater than in reality, then the maximum transmit power is considered by the radio network controller of the cellular system as smaller than it really is, meaning that the radiation would be in reality greater than is obtained by multiplying maximum transmit power and the power percentage).

The system proposed by the present invention includes also a map view. The map view is a geographic information system (GIS) view of the location of the detected radiation anomaly. This display helps the user to define the severity of the impact of the radiation anomaly event based on the type of the area (e.g., urban, suburban, rural). The map view contains relevant data regarding the detected anomaly event such as, company owner, date and time of the radiation anomaly event, percentage of deviation from the cellular antenna, and power values.

The system proposed by the present invention includes a graphical user interface (GUI) which provides a convenient working environment. The GUI includes an environmental research and report tool divided to three main areas, radiation research data setting, radiation research data view, and anomaly data display view. In one embodiment, the user can define several types of information search, for example, "General", "Abnormal", and "Reference". "General" allows the user performing a search by operators name, sector or current sector status. "Abnormal" allows the user performing a search by percentage of Radiation Anomaly, transmit power (Watts), or by date range. "Reference" allows the user performing a research based on maximum power out (Watts), or by the transmission feeder loss (dB). The GUI also provides a view of the radiation installation and radiation transmission permit requests, which have been sent to the cellular regulation authority.

The status of each sector is controlled by the system proposed by the present invention. The user can manage abnormal radiation events detected by the system of the present invention, and to send emails, alerts, SMS alerts, etc., to a pre-defined distribution list. The list can be set up in the Company Details Toolbar. The user can change the status of the sector as part of event handling.

The system proposed by the present invention is adapted to aggregate different radiation sources under the same location, into total radiation exposure in terms of power. The system can interface with a variety of cellular planning and operation tools in order to prevent radiation anomaly of occurrence even in the radio planning stage and in the operational deployment stage. The system is further adapted to use and filter online data flow that contains user's data calls, so that the system will be using only radiation related data as an input. Radiation related data is considered to be all the data included in the permit that can be retrieved on line from the cellular operator. The radiation related data is filtered from comprehensive event based records.

The system proposed by the present invention is adapted to process and analyze the data relevant for the radiation control. The system filters the relevant data from all the messages that go through the cellular system. The system is adapted to access any level of details, from high level radiation related data to the lowest radiation data related bits in the messages. Typically, every second, two messages are transferred in the network. Due to the huge size of collected data, the full framework uses fast processing and filtering algorithms to ensure close to real-time analysis.

The data must be collected as is, namely, without any operator's intervention. Thus, the data is collected close to the radiation power transmissions and is immediately protected against forgery. In one embodiment, each 15 minutes, all the messages are collected (approximately several hundreds of MB) and saved in a file. This file contains all the parameters as reported by the provider cellular system. To prevent future changes in the file, the system then "signs" the file (using water mark, for example) immediately after its creation. The system proposed by the present invention can provide seamless integration between different sources of data, from several network infrastructure vendors (e.g., ZTE, HUAWEI, Ericsson, NOKIA, Alcatel, Motorola etc). Guardian Product Portfolio can collect data from BSS, UTRAN, OMCs, and other interfaces.

The real time, continuous management is achieved due to a unique database managed by the system 202. The database is dynamically updated, based on the relevant parameters selected from the hundreds of parameters collected from the massages. Tables 1.1-1.5 disclose some of these parameters, which are monitored and used for the radiation control, according to one embodiment of the present invention.

Table 1.1 is a reference data table generated by each radiation source owner, namely the cellular operator. The table is used to reference each detected anomaly with the reference owner of the radiation source.

TABLE 1.1

Antenna Reference Parameters

| Field Name | Description | Type | Index & Keys | Necessary |
|---|---|---|---|---|
| CompanyId | Operator code | int | PK, FK | Y |
| Sector | Sector code | varchar | PK | Y |
| Timestamp | Data receiving time | datetime | | Y |
| MaxPowerOut | Max Power Out (EIRF) | float | | N |
| MaxPowerIn | Max Power Out (Watt) | float | | N |
| Longitude | Sector position—Long. | float | | Y |
| Latitude | Sector position—Lat | float | | Y |
| StatusId | Sector/site status code | int | FK | Y |

Table 1.2 is a reference data table generated by each radiation source owner, and is used by the Handling Anomaly Event system element to interface with the cellular operator base on radiation event in order to reduce the public radiation exposure time. This reference data table is also used by the Alert Generator for sending e-mail and SMS radiation alert to the radiation source owner.

TABLE 1.2

Company Parameters

| Field Name | Description | Type | Index & Keys | Necessary |
|---|---|---|---|---|
| CompanyId | Operator code | int | PK, FK | Y |
| NameFull | Operator full name | varchar | | Y |
| NameShort | Operator short name | varchar | | Y |
| Address | Address | varchar | | N |
| Phone | Phone number | varchar | | N |
| Fax | Fax number | Varchar | | N |
| EMail | Email address | varchar | | N |
| Logo | Operator logo | blob | | N |

Table 1.3 is a multilayer dynamic data table updated every 15 minutes for each radiation source owner. The data presented in this table is an exemplary of one layer or radiation related data managed by the system 202.

TABLE 1.3

Antenna Continuous Power Data Parameters

| Field Name | Description | Type | Index & Keys | Necessary |
|---|---|---|---|---|
| CompanyId | Operator code | int | IDX | Y |
| Sector | Sector code | varchar | IDX | Y |
| Timestamp | Data receiving time | datetime | IDX | Y |
| PowerValue | Radiation level | float | | N |

Table 1.4 is a dynamic data table updated every 15 minutes for each radiation source owner. The data presented in the table is set by the system operator on each radiation event handling process. The Antenna status is send as well to the cellular operator as part of the alert and handling process.

TABLE 1.4

Antenna Status Parameters

| Field Name | Description | Type | Index & Keys | Necessary |
|---|---|---|---|---|
| StatusId | Sector State code | int | IDX | Y |
| StatusDesc | Sector State Description | varchar | IDX | Y |

Table 1.5, is a dynamic data table updated every 15 minutes for each radiation source owner. The data presented in the table is set to be used for radiation pattern detection and for radiation research use by the system operator of by any environment and health research organization.

TABLE 1.5

Antenna Status History Data Parameters

| Field Name | Description | Type | Index & Keys | Necessary |
|---|---|---|---|---|
| CompanyId | Operator code | int | PK | Y |
| Sector | Sector code | varchar | PK | Y |
| Timestamp | Data receiving time | datetime | PK | Y |
| StatusIdOld | Sector Previous State | int | PK | Y |
| StatusIdNew | Sector new State | int | PK | Y |

The system 202 is targeted to monitor, detect and manage cellular radiation sources from different type of technologies and cellular vendors' infrastructures. Examples of the different support technologies are Universal Mobile Telecommunications System (UMTS), Terrestrial Radio Access Network (UTRAN), Global System for Mobile Communications (GSM), Integrated Digital Enhanced Network (iDEN), Code Division Multiple Access (CDMA), Worldwide Interoperability for Microwave Access (WiMAX), 3GPP Long Term Evolution (LTE), and any other mobile telephone technology.

Therefore, the system complies with all existing standards and protocols. One example is the 3GPP standard, in which relevant radiation power information is set under the TS 25.423 V3.14.2 (2004-07) for example. The tables provided an example of the parameters sets defined in the above telecom protocol.

Table 1.6 defines the Transmitted Carrier Power measurement report mapping in which the system is received on each data cycle. This table describes the accuracy of the power parameter to be continuously measured by the cellular network of the system of the presented invention.

TABLE 1.6

| Transmitted Carrier Power | | | |
|---|---|---|---|
| Parameter | Unit | Accuracy | Conditions & Range |
| Ptot | % | ±5 | For 5% ≤ Transmitted carrier power ≤ 95% |

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A computerized system for continuously monitoring radiation emitted from one or more radiation sources of one or more cellular networks operating in a site, comprising:
   a. a processing unit and associated software, for:
      1. collecting, without operator intervention, operator originated data files associated with logical data input to said one or more radiation sources;
      2. protecting collected data against future changes by signing said data files immediately after their creation;
      3. at a later time, extracting radiation related data from said data files;
      4. comparing radiation related data outputted from User Equipment units (UEs) with said extracted data, for detecting forgery in operator reports; and
      5. comparing said extracted radiation related data with regulation operational permits of said radiation sources to generate compared radiated data;
   b. a permits server in data communication with said processing unit, for providing regulation operational permits to said processing unit; and
   c. an anomaly generator for receiving the compared radiated data from said processing unit, and generating an anomaly data file, wherein said anomaly file is utilized for managing and controlling said radiation sources, and detecting radiation anomaly in said site.

2. A system according to claim 1, wherein the radiation sources are wireless radio telecommunication non-ionizing radiation sources.

3. A system according to claim 1, wherein the processing unit processes and analyzes radiation parameters of each radiation source according to the extracted radiation related data.

4. A system according to claim 1, wherein the processing unit processes and analyzes radiation parameters essentially on-line, within minutes.

5. A system according to claim 1, wherein the data files are binary data files comprising real-time event messages transferred between different components in the site.

6. A system according to claim 1, wherein the processing unit comprises:
   a. a delacer for extracting the radiation related data from the data files; and
   b. a verificator for comparing said radiation related data with the radiation regulation operational permits of each the radiation sources.

7. A system according to claim 6, wherein the delacer extracts power data of each antenna and sector in the site.

8. A system according to claim 6, wherein the delacer encompasses one or more decoders, adapted to analyze in parallel the data files received from the radiation sources.

9. A system according to claim 6, wherein the verificator further compares the radiation related data outputted from the UEs with the extracted data.

10. A system according to claim 1, further comprising a filter for filtering out private data related to the operator from the data files.

11. A system according to claim 1, further comprising a history database containing history data record definitions of any track record radiation based data anomaly and event handling definitions of the event track recording.

12. A method for continuously monitoring radiation emitted from one or more radiation sources of one or more cellular networks operating in a site, comprising:
   a. collecting, without operator intervention, operator originated data files associated with logical data input to said one or more radiation sources;
   b. protecting collected data against future changes by signing said data files immediately after their creation;
   c. processing said collected data and extracting radiation related data from said files, at a later time, by filtering relevant parameters values from all communication protocol layers;
   d. authenticating the data files by comparing radiation related data outputted from User Equipment units (UEs) with said extracted radiation related data;
   e. comparing said extracted radiation related data with regulation radiation permits of said one or more radiation sources;
   f. identifying an anomaly by determining when said extracted radiation related data significantly differs from said regulation radiation permits; and
   g. generating an anomaly data file in which is stored only data that is indicative of a radiation anomaly in said site.

13. The method of claim 12, further comprising collecting the data files close to a radiation power transmissions time, without operator intervention, for preventing forgery.

14. The method of claim 12, further comprising sending the anomaly data file online to a radiation source regulator within minutes after an anomalous or illegal occurrence, wherein the anomaly data file is utilized by the regulator for managing and controlling said radiation sources.

15. The method of claim 12, further comprising utilizing data in a history database for identifying abnormal and illegal radiation patterns and behaviors for health research.

16. The method of claim 12, wherein the collected data files are of different types or of different formats, and are combined in parallel.

17. A method for continuously monitoring radiation emitted from one or more radiation sources of one or more cellular networks operating in a site, comprising:
   a. collecting, without operator intervention, operator originated data files associated with logical data input to said one or more radiation sources;
   b. protecting collected data against future changes by signing said data files immediately after their creation;
   c. processing said collected data and extracting radiation related data from said files, at a later time, by filtering relevant parameters values from all communication protocol layers;
   d. comparing said radiation related data with regulation radiation permits of said one or more radiation sources;
   e. identifying an anomaly by determining when said radiation related data significantly differs from said regulation radiation permits;

f. identifying each cellular network based on a predetermined data file type or format;

g. generating transmission path characteristics and transmission power for each base station in the identified cellular network;

h. acquiring anomaly data, for each operator in the identified network, including a number of anomaly sectors in which a detected transmitted power level was found to be greater than a maximum predetermined allowed transmitted power level, a maximum anomaly which is needed for prioritizing a corrective action for the detected anomaly, an abnormal feeder loss per sector which is representative of radio frequency (RF) losses greater than a predetermined value from a multi-carrier power amplifier (MCPA) to an antenna connector, and a number of abnormal feeder loss sectors; and i. generating an anomaly data file in which is stored only data that is indicative of a radiation anomaly in said site.

18. A method for continuously monitoring radiation emitted from one or more radiation sources of one or more cellular networks operating in a site, comprising:

a. collecting, without operator intervention, operator originated data files associated with logical data input to said one or more radiation sources;

b. authenticating said data files by comparing radiation related data outputted from User Equipment units (UEs) with radiation related data from said data files of the one or more radiation sources;

c. when found to be authenticated, protecting said collected data against future changes by signing said data files immediately after their creation;

d. processing said collected data and extracting radiation related data from said files, at a later time, by filtering relevant parameters values from all communication protocol layers;

e. comparing said radiation related data from said data files with regulation radiation permits of said one or more radiation sources;

f. identifying an anomaly by determining when said radiation related data from said data files significantly differs from said regulation radiation permits; and g. generating an anomaly data file in which is stored only data that is indicative of a radiation anomaly in said site.

19. A method for continuously monitoring radiation emitted from one or more radiation sources of one or more cellular networks operating in a site, comprising:

a. collecting, without operator intervention, operator originated data files associated with logical data input to said one or more radiation sources;

b. protecting collected data against future changes by signing said data files immediately after their creation;

c. processing said collected data and extracting radiation related data from said files, at a later time, by filtering relevant parameters values from all communication protocol layers;

d. authenticating the data files by comparing radiation related data that is transferred between a network controller and the one or more radiation sources with radiation related data from the data files of the one or more radiation sources;

e. comparing said extracted radiation related data with regulation radiation permits of said one or more radiation sources;

f. identifying an anomaly by determining when said extracted radiation related data significantly differs from said regulation radiation permits; and g. generating an anomaly data file in which is stored only data that is indicative of a radiation anomaly in said site.

* * * * *